(12) United States Patent
Konishi

(10) Patent No.: US 10,366,307 B2
(45) Date of Patent: Jul. 30, 2019

(54) COARSE-TO-FINE SEARCH METHOD, IMAGE PROCESSING DEVICE AND RECORDING MEDIUM

(71) Applicant: OMRON Corporation, Kyoto (JP)

(72) Inventor: Yoshinori Konishi, Kyoto (JP)

(73) Assignee: OMRON Corporation, Kyoto (JP)

( * ) Notice: Subject to any disclaimer, the term of this patent is extended or adjusted under 35 U.S.C. 154(b) by 54 days.

(21) Appl. No.: 15/744,844

(22) PCT Filed: Oct. 27, 2016

(86) PCT No.: PCT/JP2016/081870
§ 371 (c)(1),
(2) Date: Jan. 15, 2018

(87) PCT Pub. No.: WO2017/077938
PCT Pub. Date: May 11, 2017

(65) Prior Publication Data
US 2018/0204090 A1    Jul. 19, 2018

(30) Foreign Application Priority Data
Nov. 6, 2015    (JP) .................................. 2015-218761

(51) Int. Cl.
*G06K 9/00*    (2006.01)
*G06K 9/62*    (2006.01)
(Continued)

(52) U.S. Cl.
CPC .............. *G06K 9/6202* (2013.01); *G06T 1/60* (2013.01); *G06T 7/74* (2017.01); *G06T 2207/20016* (2013.01)

(58) Field of Classification Search
None
See application file for complete search history.

(56) References Cited

U.S. PATENT DOCUMENTS

2003/0204384 A1* 10/2003 Owechko ........... G06K 9/00201
703/1
2014/0072217 A1* 3/2014 Xu ....................... G06K 9/3275
382/170

(Continued)

FOREIGN PATENT DOCUMENTS

JP    2000-069478    3/2000
JP    2004-173224    6/2004

(Continued)

OTHER PUBLICATIONS

Hinterstoisser et al., "Gradient Response Maps for Real-Time Detection of Textureless Objects", IEEE Transaction on Pattern Analysis and Machine Intelligence, May 2012, pp. 1-13.

(Continued)

*Primary Examiner* — Hadi Akhavannik
(74) *Attorney, Agent, or Firm* — JCIPRNET

(57) ABSTRACT

The coarse-to-fine search method includes: a first search step of detecting an object from a first image by means of template matching; and a second step of setting an area comprising n×m pixels within a second image having resolutions of horizontal n times and vertical m times as compared with the first image corresponding to a position detected in the first search step as a search range and detecting the object from the second image by means of template matching. During the coarse-to-fine search, data for the second image are rearranged on a work memory prior to the second search step such that data of the n×m pixels collated with same components of a template are stored in contiguous memory addresses, and n×m collation operations for the n×m pixels are executed in less than n×m calculation by SIMD commands in the second search step.

8 Claims, 12 Drawing Sheets

(51) Int. Cl.
*G06T 1/60* (2006.01)
*G06T 7/73* (2017.01)

(56) References Cited

U.S. PATENT DOCUMENTS

| 2015/0010240 A1* | 1/2015 | Sumitomo | G06K 9/4642 |
| | | | 382/205 |
| 2015/0222821 A1* | 8/2015 | Shaburova | G06T 5/005 |
| | | | 348/571 |

FOREIGN PATENT DOCUMENTS

| JP | 2008-226190 | 9/2008 |
| JP | 2010-134612 | 6/2010 |
| JP | 2014-078110 | 5/2014 |

OTHER PUBLICATIONS

"International Search Report (Form PCT/ISA/210) of PCT/JP2016/081870", dated Jan. 10, 2017, with English translation thereof, pp. 1-4.
"Written Opinion (Form PCT/ISA/237)", dated Jan. 10, 2017, with English translation thereof, pp. 1-6.
Office Action of Korean Counterpart Application, with English translation thereof, dated Jan. 29, 2019, pp. 1-5.

* cited by examiner

COARSE-TO-FINE SEARCH METHOD, IMAGE PROCESSING DEVICE AND RECORDING MEDIUM

CROSS-REFERENCE TO RELATED APPLICATION

This application is a 371 of international application of PCT application serial no. PCT/JP2016/081870, filed on Oct. 27, 2016, which claims the priority benefit of Japan application no. 2015-218761, filed on Nov. 6, 2015. The entirety of each of the abovementioned patent applications is hereby incorporated by reference herein and made a part of this specification.

TECHNICAL FIELD

The present invention relates to a technology for detecting an object from an image by means of template matching.

BACKGROUND ART

A method called template matching is a method for detecting an object from an image. Basic processing of template matching includes preparing a model (template) of an object which is a detection target in advance and evaluating conformity of image features between an input image and the template to detect a position and a posture of the object within the image. The object detection according to template matching is used in various fields such as inspection and picking, robot vision and monitoring cameras in factory automation (FA). Recently, further enhancement of the speed of template matching is required due to increase in the resolution of images, increase in the number of types of detection objects, request for real-time processing for moving images, etc.

As a technology for increasing the speed of search processing according to template matching, an algorithm called coarse-to-fine search is known. Coarse-to-fine search is a method of repeating a process of preparing a group of images having gradually different resolutions (called an image pyramid) and searching high-resolution images with respect to a search range while narrowing the search range on the basis of search results in low-resolution images to finally specify a position of an object in the original resolution image. The number of collation operations can be reduced by narrowing the search range in stages and thus the entire processing time can be decreased.

In addition, single instruction multiple data (SIMD) is a technology for increasing the speed of operation processing using computers. SIMD is a kind of parallel processing of executing operations of multiple pieces of data through a single instruction. For example, in the case of a processor including a SIMD register having a width of 128 bits, operations for 8 pieces of 16-bit data or operations for 16 pieces of 8-bit data can be processed in parallel using an instruction of 1 clock. Patent Literature 1 discloses an example in which SIMD is applied in order to increase the speed of spatial filter operations. In addition, Non-Patent Literature 1 discloses a method of continuously arranging and storing a plurality of feature quantities arranged for every T pixels in a memory in order to apply SIMD to calculation of a response map (the term "streaming simd extension (SSE)" is disclosed in Non-Patent Literature 1 instead of SIMD).

Parallel processing according to SIMD is effective for increasing the speed of processing. However, the methods of Patent Literature 1 and Non-Patent Literature 1 are specialized for the processing disclosed in the literatures and cannot be applied to the aforementioned coarse-to-fine search.

CITATION LIST

Patent Literature

[Patent Literature 1]
Japanese Unexamined Patent Application Publication No. 2010-134612

Non-Patent Literature

[Non-Patent Literature 1]
S. Hinterstoisser, et al., "Gradient Response Map for Real-Time Detection of Textureless Objects," IEEE Transaction on Pattern Analysis and Machine Intelligence, vol. 34 (5) 2012.

SUMMARY OF INVENTION

Technical Problem

An object of the present invention devised in view of the aforementioned circumstances is to provide a technology for further increasing the speed of template matching according to coarse-to-fine search.

Solution to Problem

To accomplish the object, the present invention provides a coarse-to-fine search method including: a first search step of detecting an object from a first image by means of template matching; and a second search step of setting a region of n pixels×m pixels corresponding to a position at which the object is detected in the first search step as a search range in a second image having a horizontal resolution and a vertical resolution which are respectively n times and m times as compared with the first image (n and m being integers equal to or greater than 2), and detecting the object from the second image by means of template matching, wherein the coarse-to-fine search method further including a rearrangement step of rearranging data of the second image in a work memory such that data of n×m pixels which can be collated with the same element of a template in the second search step is stored in contiguous memory addresses, prior to the second search step, and wherein n×m collation operations for the n×m pixels stored in the contiguous memory addresses in the work memory are executed for the number of times less than n×m rounds of operation processes through an SIMD instruction in the second search step.

According to this configuration, since rearrangement of the data of the second image is performed prior to the second search step, data transfer from the work memory to an SIMD register can be performed using 1 clock and the efficiency of parallel processing according to an SIMD operation can be improved. Accordingly, the speed of template matching by means of coarse-to-fine search can be further increased.

In the rearrangement step, a copy of data of (m−1) pixels continuing in the vertical direction from one of two pixels neighboring in the horizontal direction in the second image may be inserted between data of the two pixels. By performing data rearrangement according to this rule, data duplication (redundancy) can be minimized and the work memory can be saved.

In the rearrangement step, data of a template used in the second search step may be rearranged in the work memory such that data of each element of the template is stored by n×m in contiguous memory addresses. Accordingly, data transfer from the work memory to an SIMD register can be performed using 1 clock and the efficiency of parallel processing according to an SIMD operation can be improved with respect to data of a template.

In addition, another aspect of the present invention provides an image processing device including: a template matching unit which executes a search process of detecting an object from an image by means of template matching; a work memory which stores data used for the search process; a data rearrangement unit which rearranges data stored in the work memory; and a result output unit which outputs a processing result of the template matching unit, wherein the template matching unit executes a first search process of detecting an object from a first image by means of template matching, and then executes a second search process of setting a region of n pixels×m pixels corresponding to a position at which the object is detected in the first search process as a search range in a second image having a horizontal resolution and a vertical resolution which are respectively n times and m times those of the first image (n and m being integers equal to or greater than 2), and detecting the object from the second image by means of template matching, the data rearrangement unit rearranges data of the second image in a work memory such that data of n×m pixels which can be collated with the same element of a template in the second search process is stored in contiguous memory addresses, prior to the second search process, and n×m collation operations for the n×m pixels stored in the contiguous memory addresses in the work memory are executed in less than n×m rounds of operation processes through an SIMD instruction in the second search process.

According to this configuration, since rearrangement of the data of the second image is performed prior to the second search process, data transfer from the work memory to an SIMD register can be performed using 1 clock and the efficiency of parallel processing according to an SIMD operation can be improved. Accordingly, the speed of template matching by means of coarse-to-fine search can be further increased.

Further, the present invention may be regarded as a coarse-to-fine search method having at least some of the above-described processes, an object detection method or an object recognition method using the coarse-to-fine search method, or a program for causing a computer to execute such methods and a computer-readable recording medium which non-temporarily stores the program. In addition, the present invention may be regarded as an image processing device or an object recognition device which detects and recognizes an object using the coarse-to-fine search method. The above-described configurations and processes may be combined to constitute the present invention as long as no technical contradiction occurs.

Advantageous Effects of Invention

According to the present invention, it is possible to further increase the speed of template matching by means of coarse-to-fine search.

BRIEF DESCRIPTION OF DRAWINGS

FIG. 9(A) to FIG. 9(D) are diagrams showing data strings read from a work memory to an SIMD register for a collation operation.

Figures 10A, 10B, 10C, 10D:
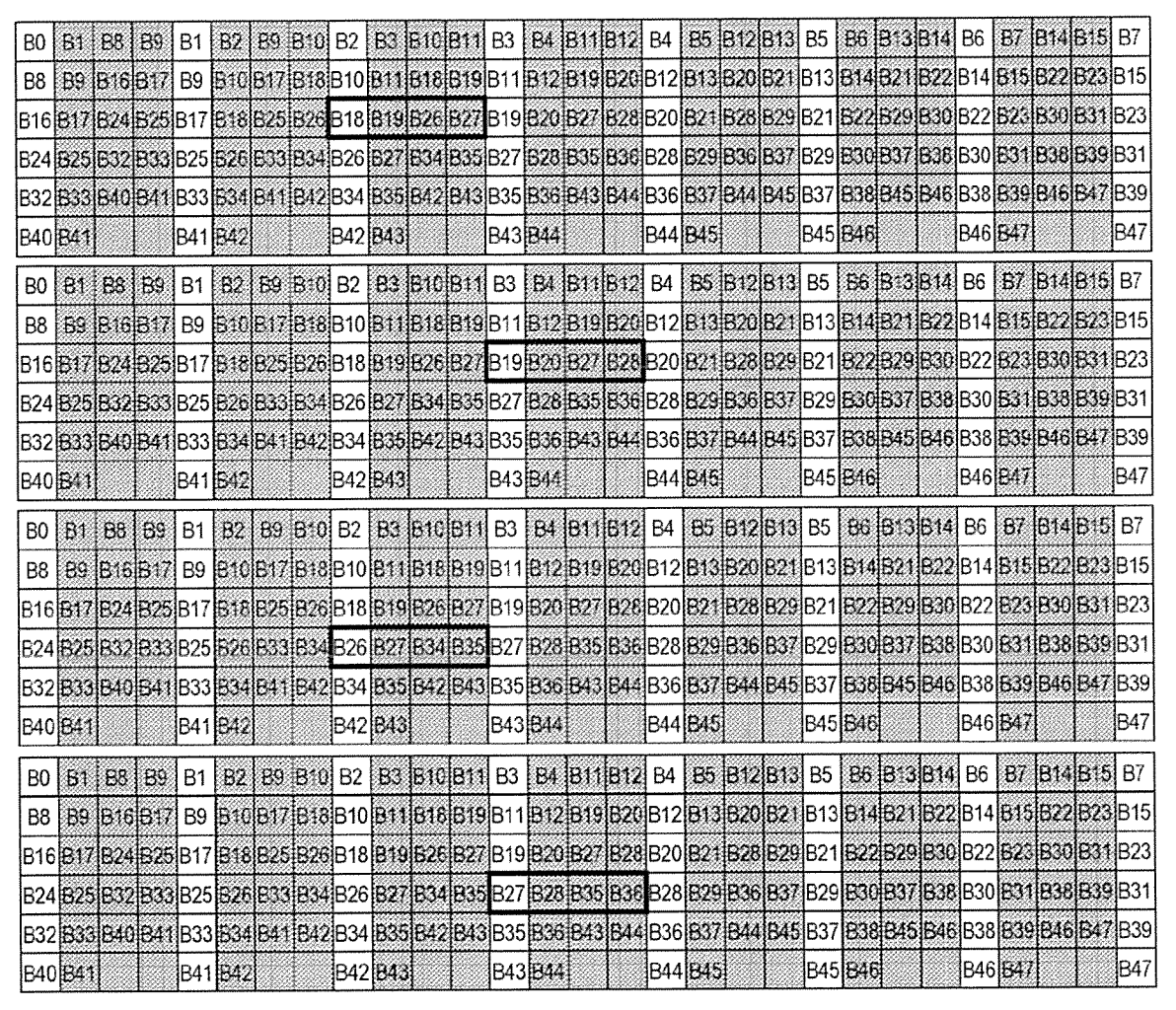

FIG. 10(A) to FIG. 10(D) are diagrams showing another example of data rearrangement.

DESCRIPTION OF EMBODIMENTS

The present invention relates to a technology for detecting an object from an image by coarse-to-fine search of template matching, and more specifically, to a technology for increasing the speed of coarse-to-fine search through parallel processing by SIMD. This technology can be applied to object recognition and the like in image sensors, computer vision, machine vision and the like for FA. In embodiments which will be described below, an example in which the present invention is applied to an image sensor for FA which determines a position and a posture of an object conveyed through a belt conveyor will be described as one of preferable application examples of the present invention.

(Overall Configuration of Object Recognition Device)

Figure 1:
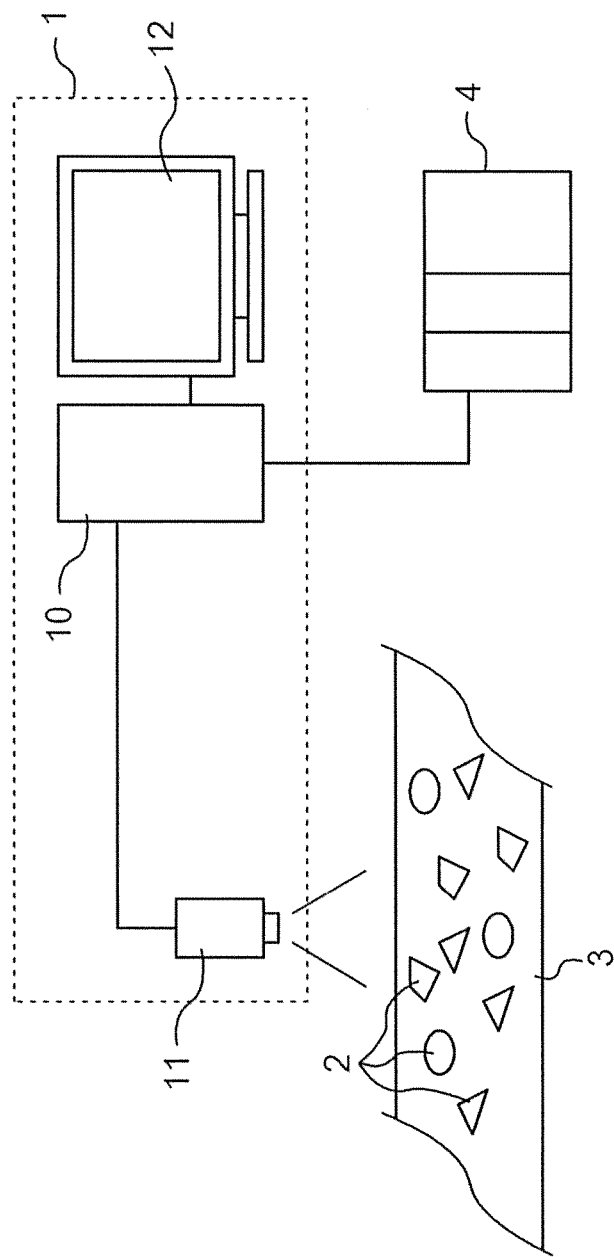
FIG. 1 is a diagram showing the overall configuration of an object recognition device.

The overall configuration and an application field of an object recognition device according to embodiments of the present invention will be described with reference to FIG. 1.

The object recognition device 1 is a system which is installed in a production line and the like and recognizes objects 2 on a conveyor 3 using images captured by a camera 11. A plurality of objects 2 are conveyed on the conveyor 3 in arbitrary postures. The object recognition device 1 receives images from the camera 11 at predetermined time intervals, executes a process of recognizing the type, position and posture of each object 2 included in the images by means of an image processing device 10 and outputs results of the process. For example, outputs (recognition results) of the object recognition device 1 are used for control of a picking robot, control of a processing device or a printing device, inspection and measurement of the objects 2, and the like.

(Hardware Configuration)

Figure 2:
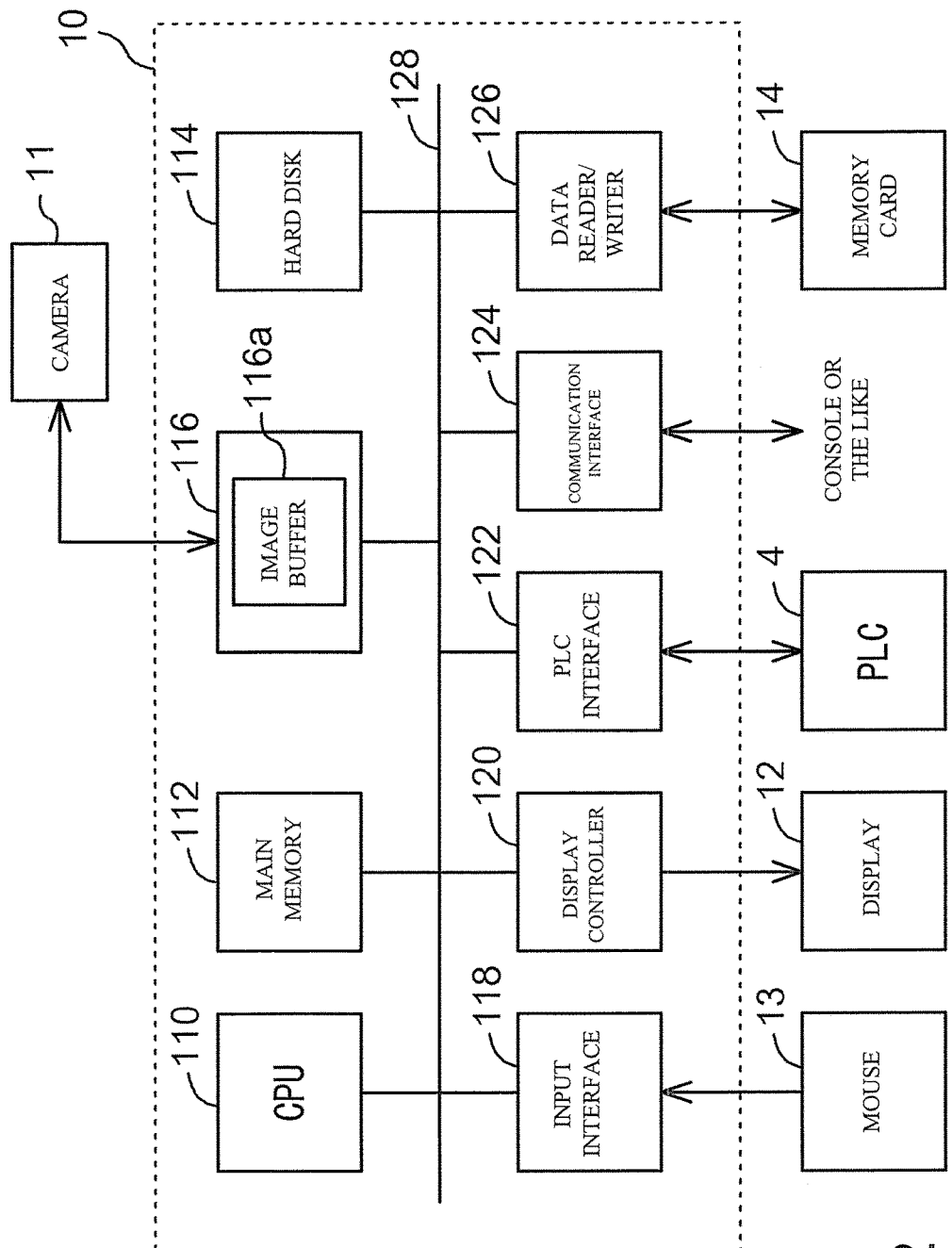
FIG. 2 is a diagram showing a hardware configuration of the object recognition device.

A hardware configuration of the object recognition device 1 will be described with reference to FIG. 2. The object recognition device 1 includes the camera 11 and the image processing device 10.

The camera 11 is a photographing device for capturing digital images of the objects 2 in the image processing device 10, and a complementary metal-oxide-semiconductor (CMOS) camera or a charge-coupled device (CCD) camera may be appropriately used, for example. The format of the input image (resolution, color/monochrome, still image/moving image, gradient, data format, etc.) is arbitrary and may be appropriately selected to be adapted for the types of the objects 2 and a sensing purpose. When special images other than visible light images (X-ray images, thermos-images and the like) are used for object recognition and inspection, a camera adapted to such images may be used.

The image processing device 10 includes a central processing unit (CPU) 110, a main memory 112 used as a work memory, a hard disk 114 which is a fixed storage unit, a camera interface 116, an input interface 118, a display controller 120, a PLC interface 122, a communication interface 124, and a data reader/writer 126. These units are connected through a bus 128 such that they can perform data communication with one another.

The camera interface 116 is a part which mediates data transfer between the CPU 110 and the camera 11 and has an image buffer 116a for temporarily storing image data from the camera 11. The input interface 118 mediates data transfer between the CPU 110 and input units (a mouse 13, a keyboard, a touch panel, a jog controller and the like). The display controller 120 is connected to a display 12 such as a liquid crystal monitor and controls display through the display 12. The PLC interface 122 mediates data transfer between the CPU 110 and a PLC 4. The communication interface 124 mediates data transfer between the CPU 110 and a console (or a personal computer or a server device) and the like. The data reader/writer 126 mediates data transfer between the CPU 110 and a memory card 14 serving as a storage medium.

The image processing device 10 may be configured as a computer having a general-purpose architecture and the CPU (processor) 110 reads and executes programs stored in the hard disk 114 or the memory card 14, thereby providing various functions. Such programs are distributed in a state of being stored in computer-readable storage medium such as the memory card 14, an optical disc and the like or provided (downloaded) through the Internet and the like. Meanwhile, a program according to the present embodiment may be provided as a single-body application program or provided as a module integrated into a part of another program. In addition, some or all of functions thereof may be replaced by a dedicated circuit such as an ASIC.

(Functional Configuration)

Figure 3:
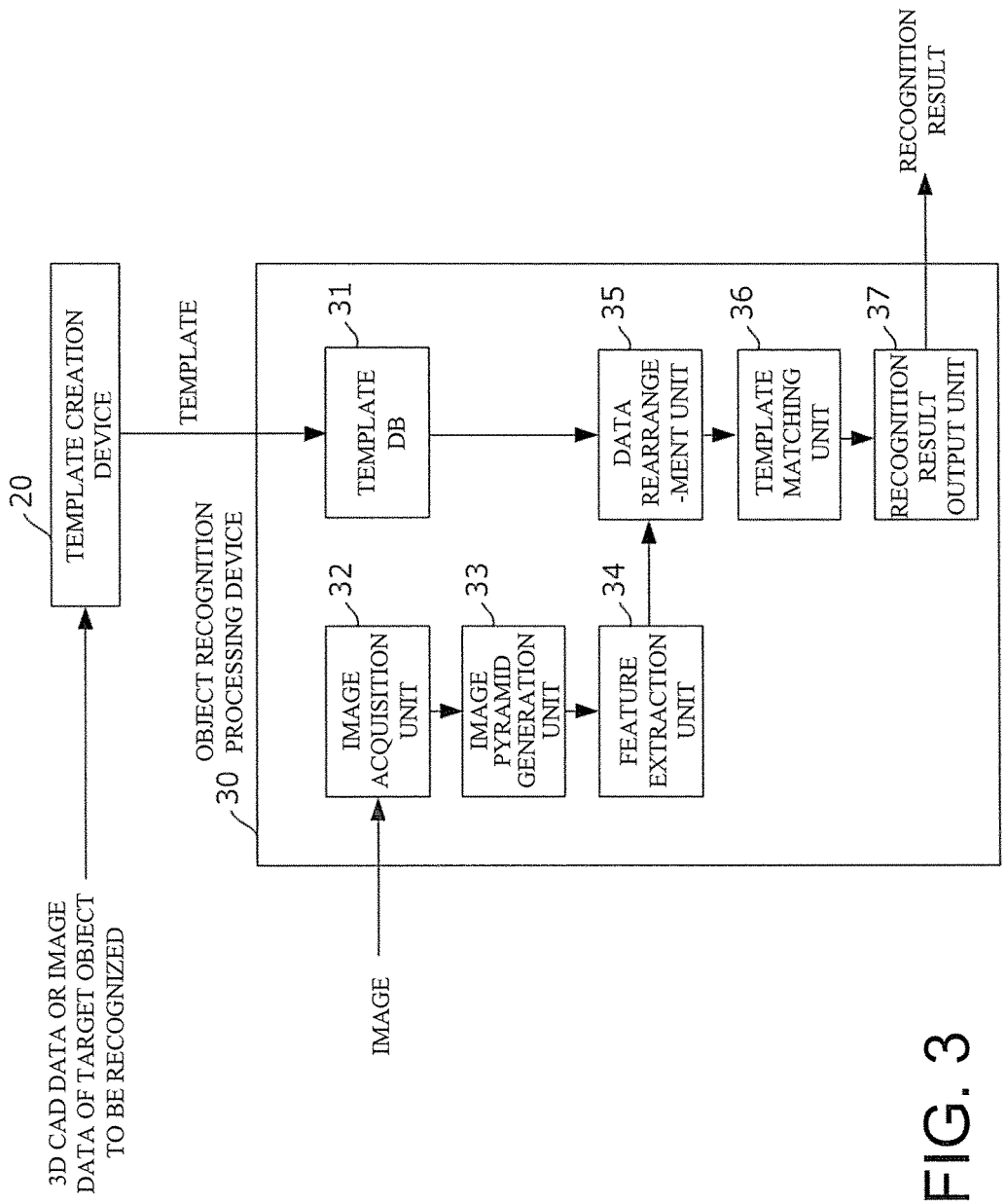
FIG. 3 is a diagram showing a functional configuration of the object recognition device.

FIG. 3 shows a functional configuration of the object recognition device 1. Functions shown in FIG. 3 are realized by the image processing device 10 executing programs. The object recognition device 1 includes a functional unit serving as a template creation device 20 and a functional unit serving as an object recognition processing device 30. The template creation device 20 is the functional unit which creates a template used in an object recognition process. Templates created by the template creation device 20 are registered in a template database (DB) 31 of the object recognition processing device 30. The object recognition processing device 30 is the functional unit which executes coarse-to-fine search according to template matching for an image received from the camera 11 to recognize an object within the image. The object recognition processing device 30 includes the template DB 31, an image acquisition unit 32, an image pyramid generation unit 33, a feature extraction unit 34, a data rearrangement unit 35, a template matching unit 36, and a recognition result output unit 37. Such functions will be described in detail below.

Figure 4:
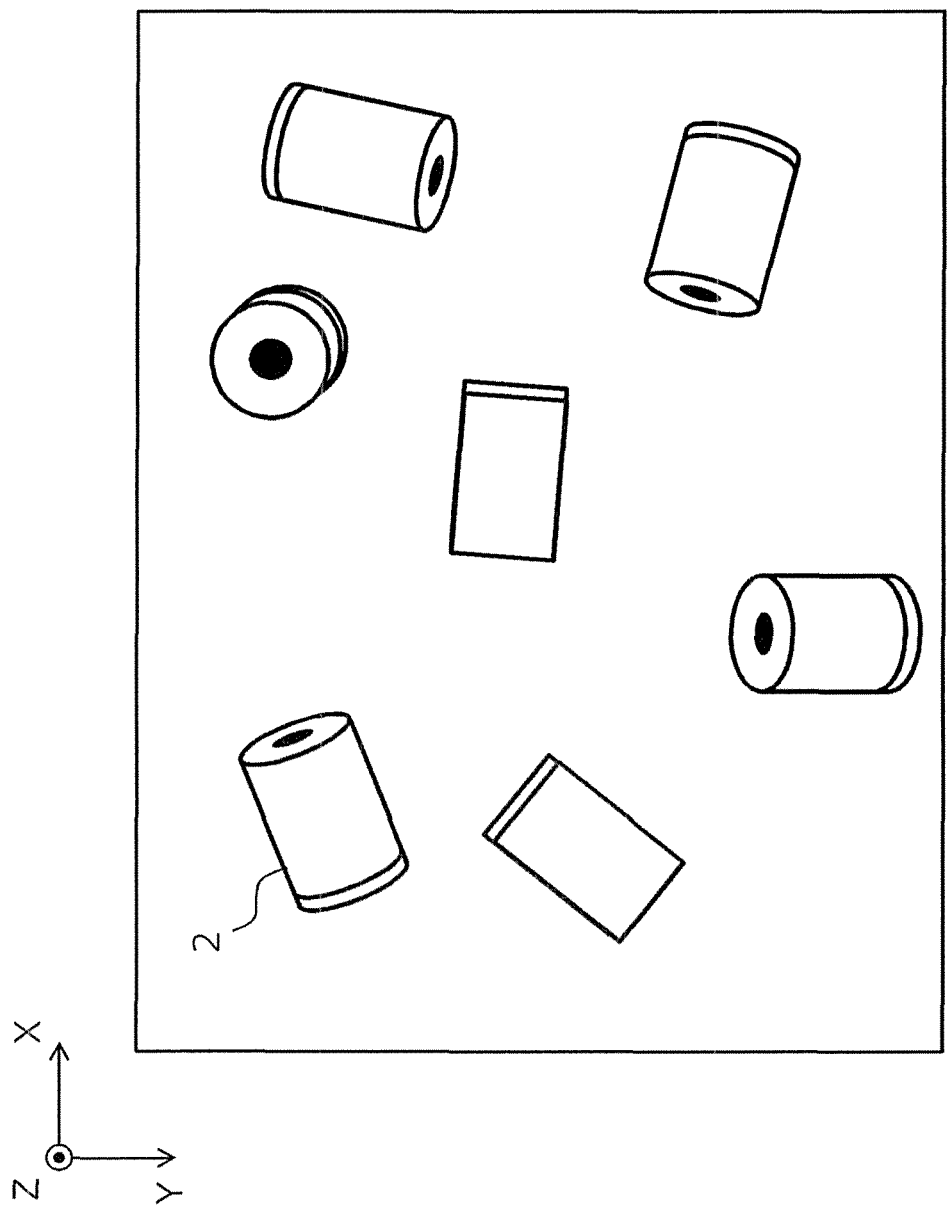
FIG. 4 is a diagram showing an example of an image captured by a camera.

FIG. 4 shows an example of an image captured by the camera 11. As shown in FIG. 4, the image includes a plurality of objects 2, and the position (X, Y and Z coordinates) and posture (angles around three axes of X, Y and Z) of each object 2 are arbitrary. When objects have different postures (orientations) for the camera 11, shapes (forms, color and the like) of the objects captured in the image are different, except for the case of a perfect sphere. Accordingly, to recognize a 3D object in any posture in general template matching using a 2D image, individual templates are prepared for respective postures of the object and matching is carried out by total round of the templates.

(Template)

Figure 5:
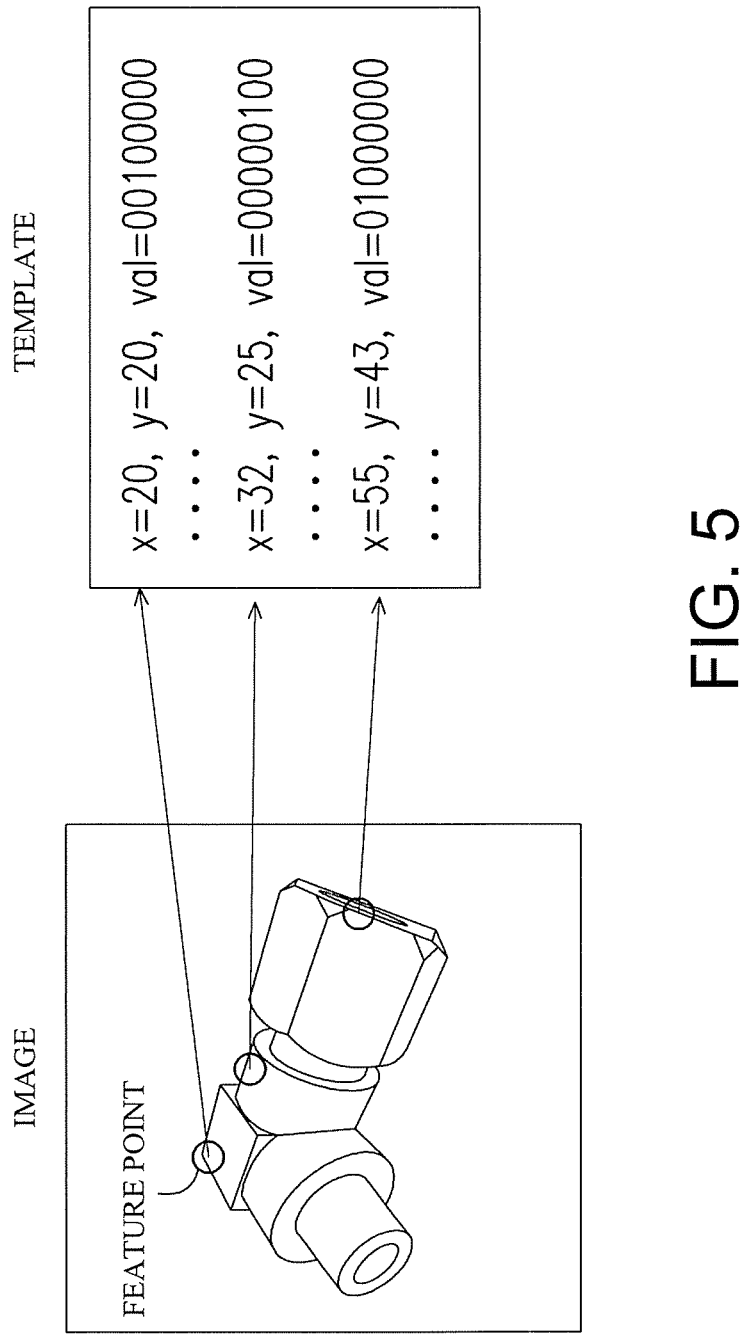
FIG. 5 is a diagram showing an example of a data structure of a template

A template is data which represents image features of an object corresponding to a detection object. Although the template may have any format, data in an arrangement format in which feature quantities of a plurality of feature points in an image are described, as shown in FIG. 5, is used in the present embodiment. Each row of a template shown on the right in FIG. 5 represents information of one feature point, and information of a feature point includes coordinates x and y of the feature point and the value val of a feature quantity.

As a feature quantity, for example, a pixel value (luminance), a luminance gradient direction, a quantization gradient direction, a histogram of oriented gradients (HOG), HAAR-like, scale-invariant feature transform (SIFT) or the like may be used. The luminance gradient direction represents a direction (angle) of gradient of luminance in a local region having a feature point as a center using continuous values and the quantization gradient direction represents a direction of gradient of luminance in a local region having a feature point as a center using a discrete value (e.g., 8 directions are saved as 1 byte information of 0 to 7). The feature quantity val of FIG. 5 represents an example in which the quantization gradient direction is represented as a binary number. Respective bits represent directions of 0 degrees, 45 degrees, 90 degrees, 135 degrees, 180 degrees, 225 degrees, 270 degrees and 315 degrees.

A template may be created by performing feature point detection and feature quantity extraction processes using an image of an object. Since known techniques can be used for feature point detection and feature quantity extraction, detailed description thereof will be omitted. An image which is a basis of a template may be obtained by photographing an actual object. Alternatively, when 3D CAD data of an object can be obtained, it is possible to acquire an image in a desired posture (view point and rotation angle) and light source through a rendering process using 3D computer graphics.

Figure 6:
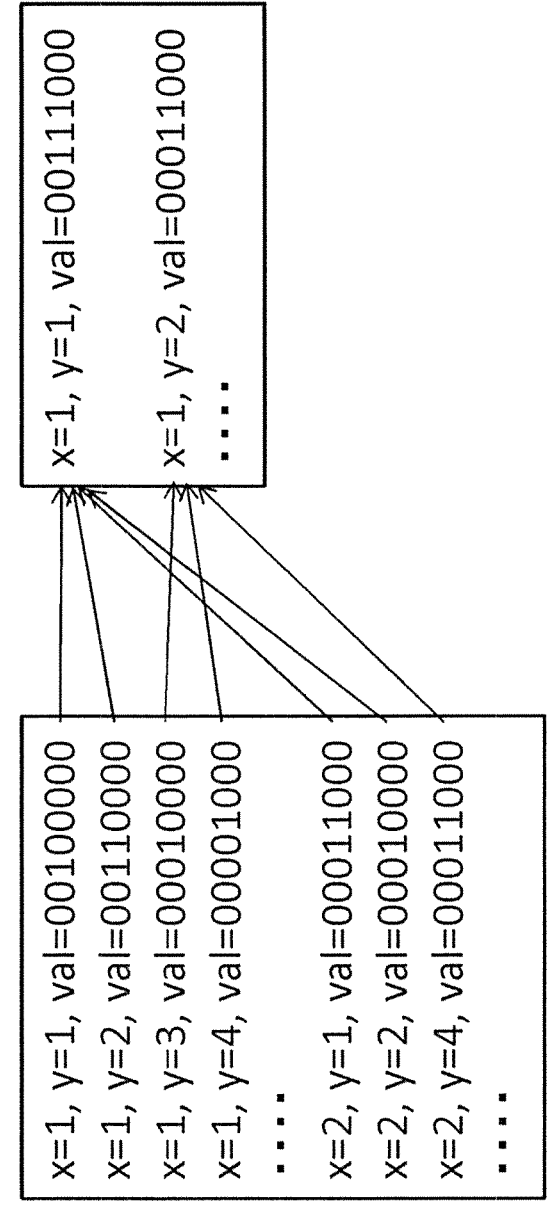
FIG. 6 is a diagram showing an example of resolution-reduction processing of a template.

Coarse-to-fine search using a plurality of images having gradually different resolutions (an image pyramid) is performed, and thus it is necessary to prepare templates depending on respective resolutions in the present embodiment, which will be described in detail below. Methods of creating a plurality of templates having different resolutions include a method of creating respective templates from a plurality of object images having different resolutions and a method of creating a template having necessary resolution by performing a resolution-reduction process on a template created from an object image having a highest resolution. The resolution-reduction process is a process of decreasing the resolution of a template by integrating a plurality of neighboring feature points on the basis of a positional relationship of feature points. FIG. 6 shows an example in which the resolution of a template is set to ½. When the resolution is set to ½, neighboring feature points within a 2×2 range are integrated into one feature point. In the example of FIG. 6, a result of integration of values of feature quantities of four feature points (1, 1), (1, 2), (2, 1) and (2, 2) becomes a value of a feature quantity of a feature point (1, 1) of a low-resolution template. In addition, a result of integration of values of feature quantities of three feature points (1, 3), (1, 4) and (2, 4) becomes a value of a feature quantity of a feature point (1, 2) of the low-resolution template. This is an example of the resolution-reduction process. Since a template can be regarded as image data having values of feature quantities as pixel values, a known image resolution conversion process may be used.

(Coarse-to-Fine Search)

Next, the coarse-to-fine search method will be described. Coarse-to-fine search is an algorithm for increasing the speed of a search process according to template matching and is also called coarse-to-precise search and pyramid search.

Figure 7:
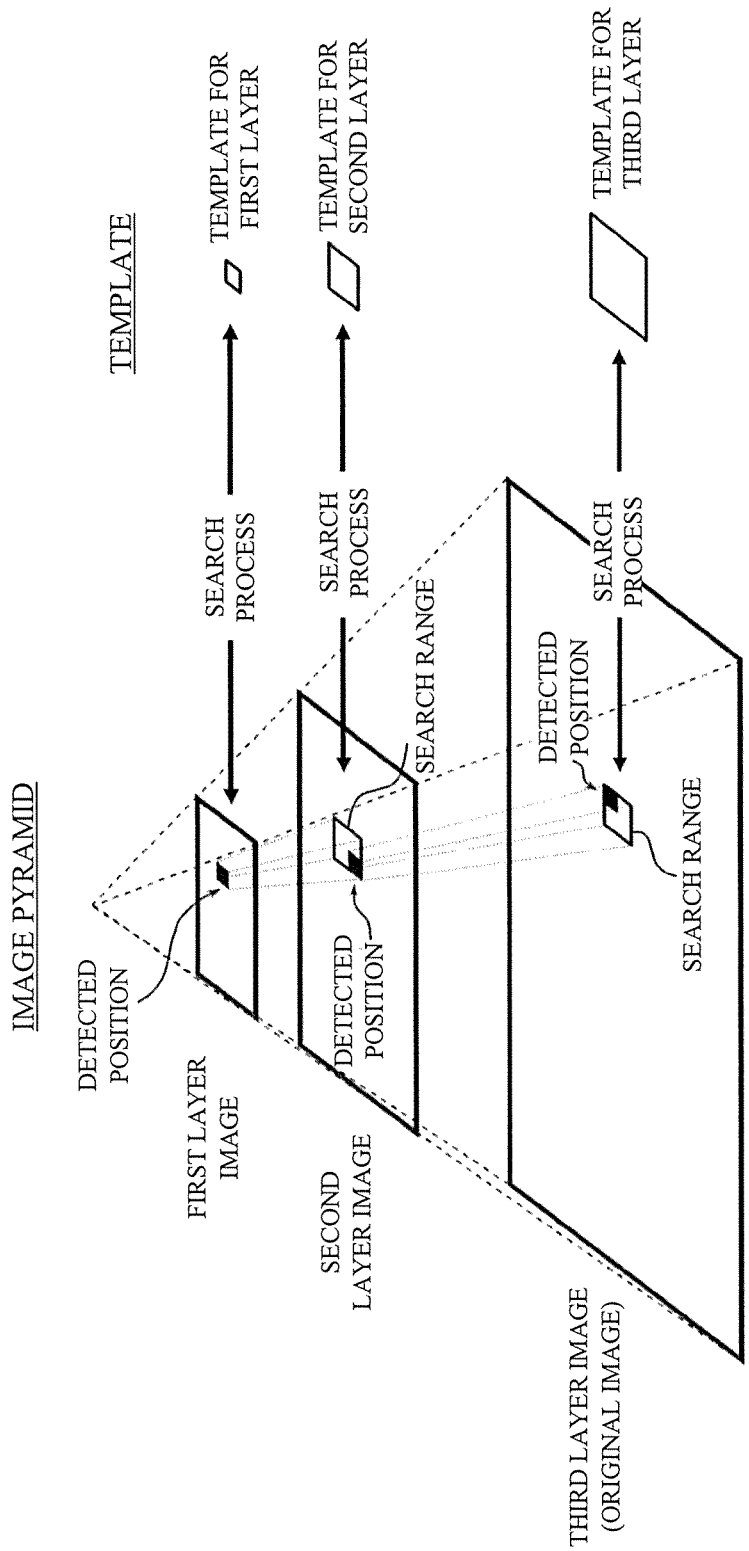
FIG. 7 is a conceptual diagram of a coarse-to-fine search algorithm.

FIG. 7 schematically shows the coarse-to-fine search algorithm. The coarse-to-fine search uses a group of k images (an image pyramid) from a first layer to a k-th layer (k is an integer equal to or greater than 2) having gradually different resolutions. The first layer image has a lowest resolution and resolution increases in the order of the second layer to the k-th layer. The (i+1)-th layer image has a horizontal resolution and a vertical resolution which are n times and m times (n and m are integers equal to or greater than 2) those of the i-th layer image (i=1, 2, . . . , k−1). Vertical and horizontal magnifications may differ from each other (i.e.,).

FIG. 7 shows an example in which k=3, n=2 and m =2. The third layer image corresponds to the original image and the resolution decreases by ½ in the order of the second layer image and the first layer image. For example, when the third layer image (original image) is an image having a VGA size of 640 pixels×480 pixels, the second layer image has a resolution of 320 pixels×240 pixels and the first layer image has a resolution of 160 pixels×120 pixels.

In the coarse-to-fine search, a search process according to template matching is initially performed on the first layer image having the lowest resolution to detect a position (candidate) at which an object is present within the first layer image. A pixel indicated by the black square in the first layer image of FIG. 7 represents the detected position. Subsequently, a region in the second layer image which corresponds to the detected position in the first layer image is set as a search range in a search process for the second layer image. In the example of FIG. 7, since the second layer image has the horizontal resolution and the vertical resolution twice those of the first layer image, the search range is a region of 2 pixels×2 pixels. In addition, the search process is performed only on the search range for the second layer image. In the same manner, a search range in the third layer image is set on the basis of a detection result in the second layer image, a search process is performed on the search range, and an object position in the third layer image (original image) is finally specified.

For example, when the number of elements of a template for the third layer image is regarded as t, the number of collation operations which are necessary when the third layer image is thoroughly searched according to conventional template matching is 640×480×t=307,200×t. On the other hand, in the case of the coarse-to-fine search, although the number of collation operations necessary for the search process performed on the first layer image is 160×120×(t/4) because only the first layer image is thoroughly searched, search ranges are limited in the following search processes and thus the number of collation operations necessary becomes 2×2×(t/2) in the search process performed on the second layer image and the number of collation operations becomes 2×2×t in the search process performed on the third layer image. Accordingly, a total of 4,806×t collation operations are required. That is, in the example of FIG. 7, the number of collation operations can be reduced to about ¹⁄₆₄ and thus processing speed can be remarkably increased.

(Speed Increase According to SIMD)

Next, an algorithm for further increasing the speed of the coarse-to-fine search by using a parallel process according to an SIMD command will be described.

In template matching, a collation operation is performed between data of each element of a template and data of each pixel of an image. Various operations such as the four fundamental arithmetic operations and logical operations using feature quantities represented by pixel data are used as collation operations. For example, when a feature quantity is luminance, collation operations such as subtraction and absolute values of subtraction are used. In addition, when a feature quantity is a quantization gradient direction, a collation operation such as an exclusive OR operation is used. When a plurality of collation operations are executed, if the collation operations are executed through a single operation process using an SIMD instruction, the speed of the search process can be increased. However, cases in which parallel processing through an SIMD instruction is effective are limited to a case in which a plurality of pieces of data simultaneously operated through a single SIMD instruction (i.e., a plurality of pieces of data stored in an SIMD register) are arranged in contiguous memory addresses in a work memory. This is because data stored in contiguous memory addresses can be transferred from the work memory to an SIMD register through an instruction of 1 clock, whereas data arranged in separated addresses in the work memory requires several clocks to be transferred from the work memory to an SIMD register (i.e., data transfer from the work memory to the SIMD register is bottlenecked) and thus the effect of parallel processing is reduced. Accordingly, rearrangement of image data is performed prior to the search process in order to maximize the efficiency of parallel processing through an SIMD instruction in the present embodiment. Here, the present algorithm has a feature in terms of execution of rearrangement of data optimized for the coarse-to-fine search based on the idea of regularity of ranges of data (search ranges) that can be referred to in the coarse-to-fine search.

Figure 8:
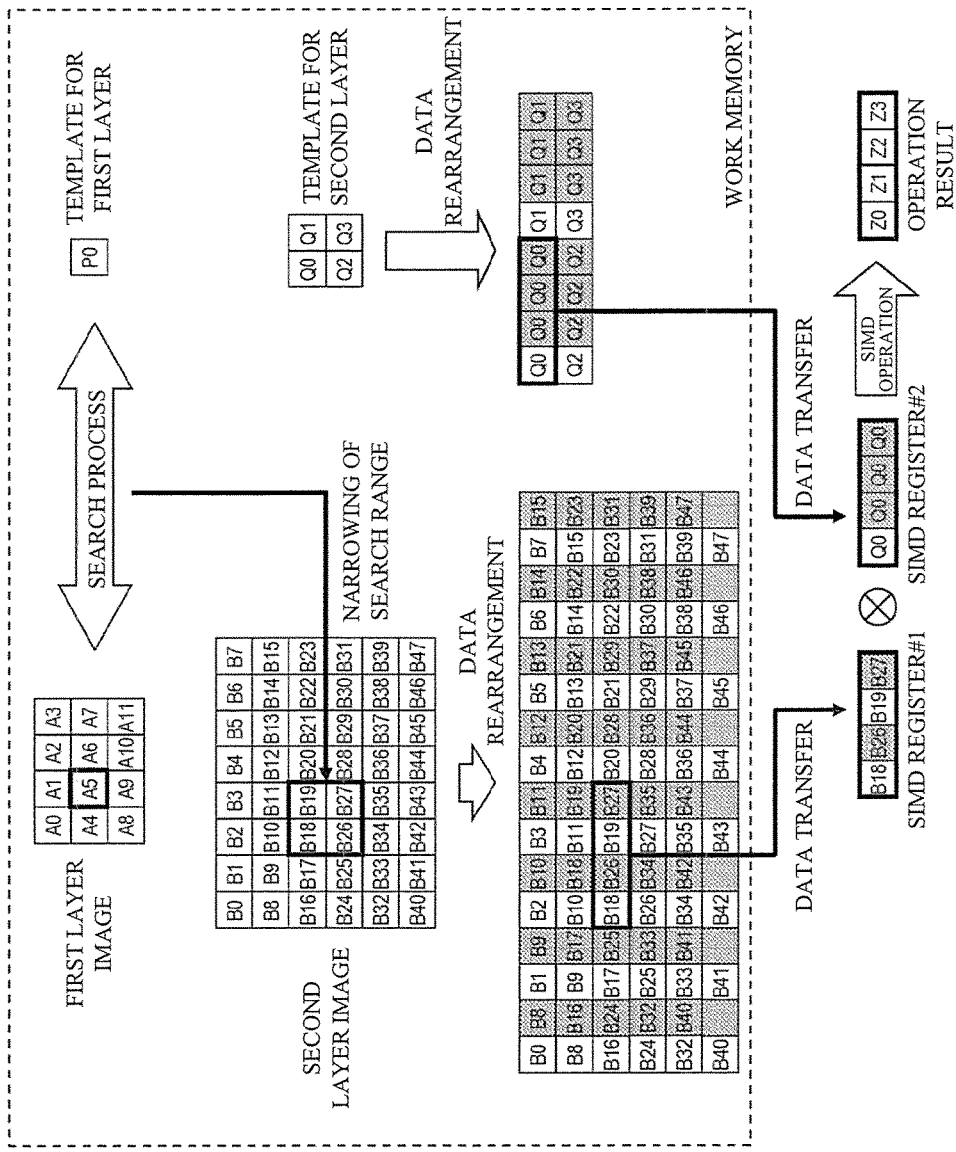
FIG. 8 is a diagram schematically showing the principle of speed improvement according to data rearrangement and SIMD.

FIG. 8 schematically illustrates the principle of speed improvement according to data rearrangement and SIMD. In FIG. 8, the size of the first layer image is regarded as 4 pixels×3 pixels and the size of the second layer image is regarded as 8 pixels×6 pixels (i.e., n=m=2) for simplification of description. In addition, the size of a template for the first layer is regarded as 1×1 and the size of a template for the second layer is regarded as 2×2. In FIG. 8, A0 to A11 indicate indexes of respective pixels of the first layer image and B0 to B47 indicate indexes of respective pixels of the second layer image. Further, P0 indicates an index of an element of the template for the first layer and Q0 to Q3 indicate indexes of respective elements of the template for the second layer. Meanwhile, for each pixel of the first layer image and the second layer image, data of feature quantity is set like each element of the templates.

In a first layer search process, the entire first layer image is searched using the template for the first layer. Specifically, the template for the first layer is sequentially applied to the pixels of the first layer image from the top left pixel A0 to perform a total of 12 rounds of collation operations of P0 and A0, P0 and A1, . . . , P0 and A11. Then, when a pixel having a feature quantity similarity that exceeds a predetermined threshold value is detected, the pixel is set as a candidate for a position at which an object is present. FIG. 8 shows an example in which the pixel A5 is detected as a candidate for the position.

A region in the second layer image which corresponds to the pixel A5 of the first layer image is a region of 2 pixels×2 pixels of B18, B19, B26 and B27. This region is set to a search range in a second layer search process. In the second layer search process, the following 16 combinations of collation operations are necessary because search is performed for 4 positions in (1) a case in which the element Q0 of the template for the second layer is applied to the position of the pixel B18 of the second layer image, (2) a case in which the element Q0 is applied to the position of the pixel B19, (3) a case in which the element Q0 is applied to the position of the pixel B26, and (4) a case in which the element Q0 is applied to the position of the pixel B27.

(1) Q0 and B18, Q1 and B19, Q2 and B26, Q3 and B27
(2) Q0 and B19, Q1 and B20, Q2 and B27, Q3 and B28
(3) Q0 and B26, Q1 and B27, Q2 and B34, Q3 and B35
(4) Q0 and B27, Q1 and B28, Q2 and B35, Q3 and B36

Here, when pixels collated with the same element of a template are observed, all of the four pixels B18, B19, B26 and B27 collated with the element Q0, the four pixels B19, B20, B27 and B28 collated with the element Q1, the four pixels B26, B27, B34 and B35 collated with the element Q2, and the four pixels B27, B28, B35 and B36 collated with the element Q3 are arranged in the form of a 2×2 block in the second layer image. Accordingly, the data of the second layer image is rearranged such that any four pixels arranged in the form of a 2×2 block in the second layer image are arranged in contiguous addresses in the work memory. In FIG. 8, data rearrangement is performed according to the rule of inserting a copy of pixels (hatched pixels) neighboring in the column direction (vertical direction) of the original pixels (pixels represented as white blanks) of the second layer image into the next address of the original pixels. Meanwhile, dummy data may be inserted in the final row because there is no pixel neighboring in the column direction.

Furthermore, data rearrangement is also performed on the template for the second layer. Specifically, a data string is created such that four elements of each element Q0 to Q3 of the template are consecutively arranged, as shown in FIG. 8.

When the above-described data rearrangement is performed as pre-processing (advance preparation), for example, four collation operations between the element Q0 and four pixels B18, B19, B26 and B27 can be executed using 3 clocks of (1) transfer of a data string of B18, B19, B26 and B27 from the work memory to SIMD register #1,
(2) transfer of a data string of Q0, Q0, Q0 and Q0 from the work memory to SIMD register #2, and
(3) batch operation according to an SIMD instruction.

As shown in FIG. 9(A) to FIG. 9(D), efficient parallel processing according to SIMD can also be performed with respect to collation operations between the element Q1 and pixels B19, B20, B27 and B28, collation operations between the element Q2 and pixels B26, B27, B34 and B35, and collation operations between the element Q3 and pixels B27, B28, B35 and B36 as well as collation operations with respect to the element Q0.

The data rearrangement method (arrangement method) is not limited to the example of FIG. 8. For example, as shown in FIG. 10(A) to FIG. 10(D), data strings of all combinations of four pixels which can be collated with the same element of a template may be prepared. Although this arrangement method increases a necessary memory size compared to the arrangement method of FIG. 8, efficient parallel processing according to SIMD is possible as in the arrangement method of FIG. 8.

In the above description, the search range of the second layer search process is a region of 2 pixels×2 pixels and the number of pixels which can be collated with the same element of a template is 4 because the ratio of the horizontal and vertical resolutions of the second layer image to those of the first layer image is twice (n=m=2). When the resolution ratio is not equal to 2, the same process can also be performed. In addition, the same process can be performed between the second layer image and the third layer image, . . . , between the i-th layer image and the (i+1)-th layer image, . . . , between the (k−1)-th layer image and the k-th layer image as well as between the first layer image and the second layer image.

Figure 11:
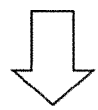
FIG. 11 is a diagram showing another example of data rearrangement.

When this is generalized, if a second image having a horizontal resolution n times that of a first image and a vertical resolution m times that of the first image (n and m being integers equal to or greater than 2) is conceived, a search range in the second image which corresponds to a position detected through a search process performed for the first image becomes a region of n pixels×m pixels. Accordingly, the number of pixels which can be collated with the same element of a template in a search process for the second image is n×m. Hence, the data of the second image are rearranged in the work memory such that the data of the n×m pixels are stored in contiguous memory addresses. Then, the data string of the n×m pixels can be transferred to an SIMD register using 1 clock and n×m rounds of collation operations can be executed through one-time operation process using an SIMD instruction. As a data rearrangement method, a method of inserting, between data of two pixels neighboring in the row direction (horizontal direction) in the second image, a copy of data of (m−1) pixels continuing from one of the two pixels in the column direction (vertical direction) is desirable. When rearrangement is performed according to this rule, data duplication (redundancy) is minimized and thus the work memory can be saved. FIG. 11 shows an example in which n=2 and m=3.

(Object Recognition Process)

Figure 12:
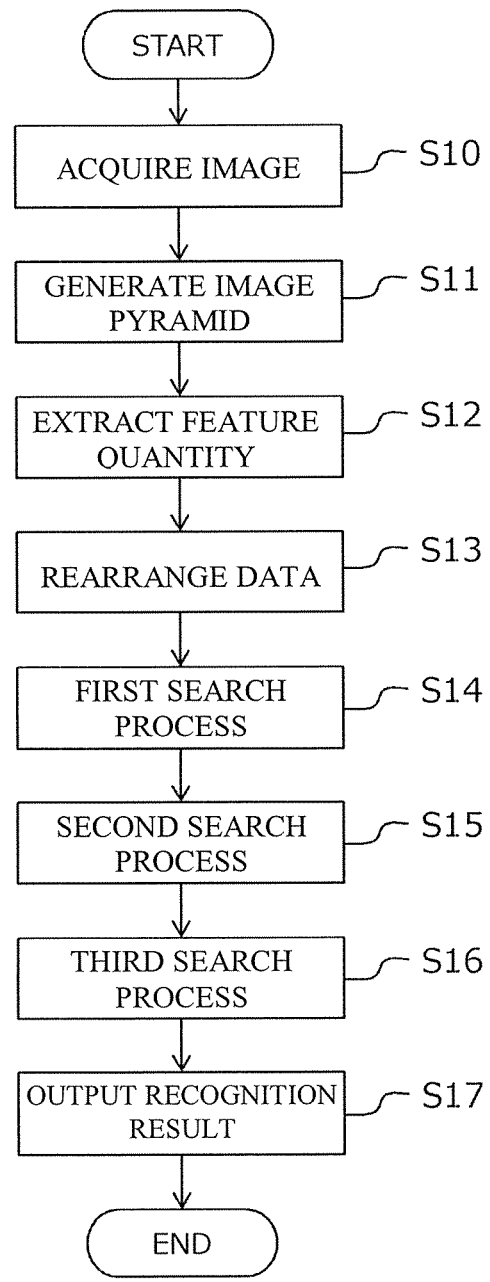
FIG. 12 is a flowchart showing a flow of an object recognition process.

Next, a flow of an object recognition process executed by the object recognition processing device 30 will be described according to the flow of FIG. 12.

First, the image acquisition unit 32 receives an image from the camera 11 (step S10). Subsequently, the image pyramid generation unit 33 generates low-resolution images from the original image received in step S10 to generate an image pyramid (step S11). In the present embodiment, an image pyramid composed of three images of the first layer image (160 pixels×120 pixels), the second layer image (320 pixels×240 pixels) and the third layer image (640 pixels× 480 pixels), as shown in FIG. 7, is used.

Next, the feature extraction unit 34 performs a feature extraction process for each layer image of the image pyramid (step S12). Here, the extracted feature quantities are the same type as feature quantities of templates and quantization gradient directions are used in the present embodiment. As a result of the feature extraction process performed on the first layer image, an image having the same resolution as that of the first layer image and having data (feature values) of feature quantities extracted at pixel positions of the first layer image as pixel values (referred to as a first layer feature image hereinafter) is obtained. In the same manner, a second layer feature image is obtained as a result of the feature extraction process performed on the second layer image and a third layer feature image is acquired as a result of the feature extraction process performed on the third layer image. The first to third layer feature images also constitute an image pyramid.

Subsequently, the data rearrangement unit 35 rearranges data of the second layer feature image and data of the third layer feature image in the work memory (step S13). This rearrangement process is a pre-process for increasing the speed of the following collation process of template matching according to coarse-to-fine search. A specific data rearrangement method will be described below.

The template matching unit 36 executes a first search process using the first layer feature image and a template for the first layer (step S14). Meanwhile, when multiple types of objects are detection targets or there is a template for each posture of an object, the process of step S14 is repeated for respective templates.

Subsequently, the template matching unit 36 sets a search range of the second layer feature image on the basis of the detection result of the first search process and executes a second search process using the second layer feature image and a template for the second layer (step S15). In the second search process, four collation operations for 2×2 pixels stored in contiguous addresses in the work memory are executed through a one-time operation process according to an SIMD instruction, as described above. When multiple types of objects are detection targets or there is a template for each posture of an object, the process of step S15 is repeated for respective templates. In addition, when a plurality of candidates for a position at which an object is present are detected in the first search process, the process of step S15 is repeated for each of the detected candidates.

Subsequently, the template matching unit 36 sets a search range of the third layer feature image on the basis of the detection result of the second search process and executes a third search process using the third layer feature image and a template for the third layer (step S16). In the third search process, four collation operations for 2×2 pixels stored in contiguous addresses in the work memory are executed through a one-time operation process according to SIMD instruction, as described above. When multiple types of objects are detection targets or there is a template for each posture of an object, the process of step S16 is repeated for respective templates. In addition, when a plurality of candidates for a position at which an object is present are detected in the second search process, the process of step S16 is repeated for the detected candidates.

As a result of the above-described processes, a position at which an object is present in the third layer feature image having the same resolution as that of the original image can be specified. In addition, when a plurality of templates are used, the type and posture of an object can be recognized according to which template has been most matched. This recognition result is output to an external device or a display by the recognition result output unit 37 (step S17). For example, information of the recognition result is used for control of a picking robot, control of a processing device or a printing device, inspection and measurement of the objects 2, and the like.

Advantages of Present Embodiment

According to the above-described configurations, data transfer from the work memory to an SIMD register can be performed using 1 clock and the efficiency of parallel processing according to an SIMD operation can be improved by performing data rearrangement in the work memory prior to a search process. Accordingly, it is possible to further increase the speed of template matching according to coarse-to-fine search.

MODIFIED EXAMPLE

The configurations of the above-described embodiments merely illustrate a specific example of the present invention and do not limit the scope of the present invention. The present invention may employ various specific configurations without departing from the spirit or scope of the present invention.

For example, although data of the entire image is rearranged prior to execution of coarse-to-fine search in the above-described embodiments, only data of a necessary region within the image may be rearranged on the basis of the detection result of the first search process. Accordingly, reduction of time and memory necessary for data rearrangement can be expected. In addition, although the n×m rounds of collation operations are executed through a one-time SIMD operation in the above-described embodiments, the n×m rounds of collation operations may be executed through a plurality of rounds (less than n×m) of SIMD operations in a case in which the n×m rounds of collation operations cannot be performed through one-time SIMD operation such as a case in which data used in the n×m rounds of collation operations has a width greater than data of an SIMD register. That is, the speed of the search process can be improved if the n×m rounds of collation operations can be replaced by less than n×m rounds of SIMD operations.

The invention claimed is:

1. A coarse-to-fine search method, comprising:
    a first search step of detecting an object from a first image by means of template matching; and
    a second search step of setting a region of n pixels×m pixels corresponding to a position at which the object is detected in the first search step as a search range in a second image having a horizontal resolution and a vertical resolution which are respectively n times and m times as compared with the first image (n and m being integers equal to or greater than 2), and detecting the object from the second image by means of template matching, wherein the coarse-to-fine search method further comprises:
    a rearrangement step of rearranging data of the second image in a work memory such that data of n×m pixels which can be collated with the same element of a template in the second search step is stored in contiguous memory addresses, prior to the second search step,
    wherein n×m collation operations for the n×m pixels stored in the contiguous memory addresses in the work memory are executed for the number of times less than n×m rounds of operation processes through an SIMD instruction in the second search step.

2. The coarse-to-fine search method according to claim 1, wherein, in the rearrangement step, a copy of data of (m−1) pixels continuing in the vertical direction from one of two pixels neighboring in the horizontal direction in the second image is inserted between data of the two pixels.

3. The coarse-to-fine search method according to claim 1, wherein, in the rearrangement step, data of a template used in the second search step is rearranged in the work memory such that data of each element of the template is stored by n×m in contiguous memory addresses.

4. A non-transitory recording medium storing a program for causing a computer to execute each step of the coarse-to-fine search method according to claim 1.

5. An image processing device, comprising:
a template matching unit which executes a search process of detecting an object from an image by means of template matching;
a work memory which stores data used for the search process;
a data rearrangement unit which rearranges data stored in the work memory; and
a result output unit which outputs a processing result of the template matching unit,
wherein the template matching unit executes a first search process of detecting an object from a first image by means of template matching, and then executes a second search process of setting a region of n pixels×m pixels corresponding to a position at which the object is detected in the first search process as a search range in a second image having a horizontal resolution and a vertical resolution which are respectively n times and m times as compared with the first image (n and m being integers equal to or greater than 2), and detecting the object from the second image by means of template matching,
the data rearrangement unit rearranges data of the second image in a work memory such that data of n×m pixels which can be collated with the same element of a template in the second search process is stored in contiguous memory addresses, prior to the second search process, and
n×m collation operations for the n×m pixels stored in the contiguous memory addresses in the work memory are executed in less than n×m rounds of operation processes through an SIMD instruction in the second search process.

6. The coarse-to-fine search method according to claim 2, wherein, in the rearrangement step, data of a template used in the second search step is rearranged in the work memory such that data of each element of the template is stored by n×m in contiguous memory addresses.

7. A non-transitory recording medium storing a program for causing a computer to execute each step of the coarse-to-fine search method according to claim 2.

8. A non-transitory recording medium storing a program for causing a computer to execute each step of the coarse-to-fine search method according to claim 3.

* * * * *